United States Patent
Miyazawa et al.

(10) Patent No.: US 10,911,622 B2
(45) Date of Patent: Feb. 2, 2021

(54) NON-TRANSITORY STORAGE MEDIUM STORING INSTRUCTIONS EXECUTABLE BY INFORMATION PROCESSING APPARATUS COMMUNICABLE WITH FUNCTION EXECUTING APPARATUS, AND THE INFORMATION PROCESSING APPARATUS

(71) Applicant: Brother Kogyo Kabushiki Kaisha, Nagoya (JP)

(72) Inventors: Masafumi Miyazawa, Nagoya (JP); Yuki Yada, Kuwana (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 16/744,617

(22) Filed: Jan. 16, 2020

(65) Prior Publication Data

US 2020/0244827 A1 Jul. 30, 2020

(30) Foreign Application Priority Data

Jan. 25, 2019 (JP) ................................. 2019-010882

(51) Int. Cl.
*G06F 15/00* (2006.01)
*G06F 3/12* (2006.01)
(Continued)

(52) U.S. Cl.
CPC ....... *H04N 1/00477* (2013.01); *G06F 3/1204* (2013.01); *G06F 3/1231* (2013.01); *H04N 1/00424* (2013.01)

(58) Field of Classification Search
CPC ............ H04N 1/00477; H04N 1/00424; G06F 3/1204; G06F 3/1231
(Continued)

(56) References Cited

U.S. PATENT DOCUMENTS

2009/0287806 A1* 11/2009 Hamilton, II ......... G06F 3/1226
709/223
2011/0141517 A1* 6/2011 Yokoyama ............ G06F 3/1203
358/1.15
(Continued)

FOREIGN PATENT DOCUMENTS

JP 2000-181641 A 6/2000

*Primary Examiner* — Douglas Q Tran
(74) *Attorney, Agent, or Firm* — Burr & Brown, PLLC (57) ABSTRACT

A non-transitory storage medium stores instructions executable by an information processing apparatus. The plurality of instructions causes the information processing apparatus to perform: setting a type of a task for execution of a processing relating to a function executing apparatus; identifying the function executing apparatus communicable with the information processing apparatus; determining whether the identified function executing apparatus satisfies a particular condition; when the identified function executing apparatus satisfies the particular condition, causing the function executing apparatus satisfying the particular condition and/or the information processing apparatus to perform the task of the set type; and when the identified function executing apparatus does not satisfy the particular condition, not causing the function executing apparatus determined in the third processing not to satisfy the particular condition and the information processing apparatus to perform the task of the set type.

11 Claims, 6 Drawing Sheets

(51) Int. Cl.
*G06K 1/00* (2006.01)
*H04N 1/00* (2006.01)

(58) Field of Classification Search
USPC .............................. 358/1.1, 1.15, 1.13, 1.14
See application file for complete search history.

(56) References Cited

U.S. PATENT DOCUMENTS

2016/0210091 A1\* 7/2016 Martin .................. G06F 3/1288
2020/0097227 A1\* 3/2020 Yasui ...................... G06F 3/126
2020/0133596 A1\* 4/2020 Hirano ............... H04N 1/00127

\* cited by examiner

NON-TRANSITORY STORAGE MEDIUM STORING INSTRUCTIONS EXECUTABLE BY INFORMATION PROCESSING APPARATUS COMMUNICABLE WITH FUNCTION EXECUTING APPARATUS, AND THE INFORMATION PROCESSING APPARATUS

CROSS REFERENCE TO RELATED APPLICATION

The present application claims priority from Japanese Patent Application No. 2019-010882, which was filed on Jan. 25, 2019, the disclosure of which is herein incorporated by reference in its entirety.

BACKGROUND

The following disclosure relates to a technique of setting and managing a task to be executed by at least one of a function executing apparatus or an information processing apparatus.

There is known a network printer system in which a display of an information processing apparatus displays icons indicating respective states of a plurality of printers.

SUMMARY

However, there are not known processings in the case where a new function executing apparatus such as a printer is connected to the network, for example. In this case, for example, it is considered to manually performing a setting for performing a task of sending another information processing apparatus information indicating a state of the function executing apparatus, but this configuration may increase the load of operations for a user of the information processing apparatus.

Accordingly, an aspect of the disclosure relates to a technique of reducing the load of operations for a user of an information processing apparatus in the case where a new function executing apparatus is connected to a network, by manually performing a setting for performing a task of sending another information processing apparatus information indicating a state of the function executing apparatus, for example.

In one aspect of the disclosure, a non-transitory storage medium stores a plurality of instructions executable by a processor of an information processing apparatus communicable with a function executing apparatus. The plurality of instructions, when executed by the processor, cause the information processing apparatus to execute: a first processing in which the information processing apparatus sets a type of a task that is to be executed by at least one of the information processing apparatus or the function executing apparatus and that is for execution of a processing relating to the function executing apparatus; a second processing in which the information processing apparatus identifies the function executing apparatus communicable with the information processing apparatus; a third processing in which the information processing apparatus determines whether the function executing apparatus identified in the second processing satisfies a particular condition; and a fourth processing in which when the information processing apparatus determines in the third processing that the function executing apparatus identified in the second processing satisfies the particular condition, the information processing apparatus causes at least one of the function executing apparatus determined in the third processing to satisfy the particular condition or the information processing apparatus to perform the task of the type set in the first processing, and when the information processing apparatus determines in the third processing that the function executing apparatus identified in the second processing does not satisfy the particular condition, the information processing apparatus does not cause the function executing apparatus determined in the third processing not to satisfy the particular condition and the information processing apparatus to perform the task of the type set in the first processing.

In another aspect of the disclosure, an information processing apparatus is communicable with a function executing apparatus. The information processing apparatus includes a controller. The controller is configured to execute: a first processing in which the controller sets a type of a task that is to be executed by at least one of the information processing apparatus or the function executing apparatus to be searched and that is for execution of a processing relating to the function executing apparatus; a second processing in which the controller identifies the function executing apparatus communicable with the information processing apparatus; a third processing in which the controller determines whether the function executing apparatus identified in the second processing satisfies a particular condition; and a fourth processing in which when the controller determines in the third processing that the function executing apparatus identified in the second processing satisfies the particular condition, the controller causes at least one of the function executing apparatus determined in the third processing to satisfy the particular condition or the information processing apparatus to perform the task of the type set in the first processing, and when the controller determines in the third processing that the function executing apparatus identified in the second processing does not satisfy the particular condition, the controller does not cause the function executing apparatus determined in the third processing not to satisfy the particular condition and the information processing apparatus to perform the task of the type set in the first processing.

It is noted that the techniques in the present disclosure may be achieved in various forms. For example, the present disclosure may be applied to a method of installing a computer program.

BRIEF DESCRIPTION OF THE DRAWINGS

The objects, features, advantages, and technical and industrial significance of the present disclosure will be better understood by reading the following detailed description of the embodiments, when considered in connection with the accompanying drawings, in which.

EMBODIMENTS

Hereinafter, there will be described a computer program and an information processing apparatus according to one embodiment. It is to be understood that the following embodiments are described only by way of example, and the disclosure may be otherwise embodied with various modifications without departing from the scope and spirit of the disclosure.

Main Electric Configuration of Information Processing Apparatus

Figure 1:
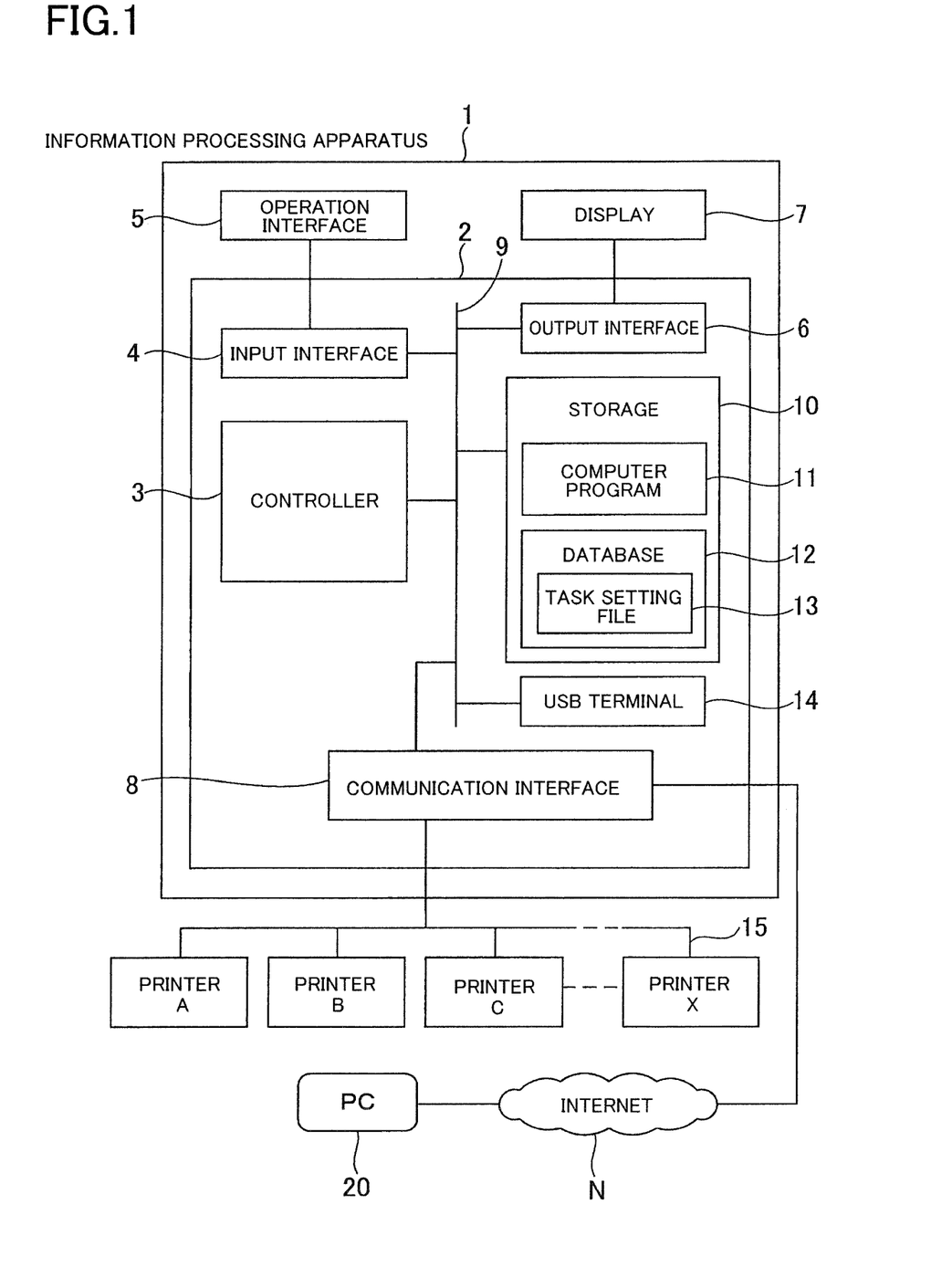
FIG. 1 is a view for explaining a main electric configuration of an information processing apparatus according to one embodiment.

There will be described a main electric configuration of the information processing apparatus according to the embodiment with reference to FIG. 1. As illustrated in FIG. 1, an information processing apparatus 1 according to the embodiment includes an information-processing-apparatus body 2, an operation interface 5, and a display 7. The information processing apparatus 1 is a personal computer (PC), for example, and the size and the configuration thereof are not limited. Examples of the PC include a desktop PC, a notebook PC, and a tablet PC. The information processing apparatus 1 may be a mobile terminal. A user operates the operation interface 5 to input information. The operation interface 5 includes a keyboard and a pointing device such as a mouse. The operation interface 5 may include a pointing device such as a touch screen and a touchpad. The display 7 is configured to display information input using the operation interface 5, and information processed by the information-processing-apparatus body 2, for example. The display 7 includes a display device including a liquid crystal display panel or an organic-light-emitting-diode panel.

The information-processing-apparatus body 2 includes a controller 3, a storage 10, an input interface 4, an output interface 6, and a communication interface 8. The controller 3, the storage 10, the input interface 4, the output interface 6, and the communication interface 8 are electrically connected to each other via a bus 9. The operation interface 5 is electrically connected to the input interface 4. The display 7 is electrically connected to the output interface 6. In the present embodiment, the communication interface 8 is configured to connect the information processing apparatus 1 to a wired local area network (LAN). A plurality of printers A-X are connected over the LAN 15 respectively to communication ports, not illustrated, connected to the communication interface 8, such that each of the printers A-X is communicable with the information processing apparatus 1. Each of the printers may be a printer having only a printing function, or a multi-function peripheral (MFP) having the printing function, a copying function, a scanner function, and a facsimile function, for example. The communication interface 8 has a function of communicating with a personal computer (PC) 20 over the Internet N. A universal-serial-bus (USB) terminal 14 is connected to the bus 9. In the following description, each of the printers A-X may be referred to as "printer" in the case where a common configuration of the printers A-X is explained. The printer is one example of a function executing apparatus.

The controller 3 includes a central processing unit (CPU), not illustrated. The storage 10 includes memories, not illustrated, such as a read only memory (ROM), a random access memory (RAM), a synchronous dynamic random access memory (SDRAM), and a hard disc drive (HDD). The storage 10 stores a computer program 11 that is executed by the controller 3. A database 12 of the storage 10 stores a task setting file 13.

The controller 3 controls the overall information processing apparatus 1. In particular, the controller 3 executes the computer program 11 to search for a printer or printers communicable with the information processing apparatus 1 and communicate with each printer found by the search to manage a state of each printer. Here, examples of the state of the printer include: states of consumables used in the printer; settings of the printer; and points of malfunctions and failures. The consumables are toner, a photoconductive drum, and so on in the case where the printer is a laser printer that uses toner for printing. The consumables are ink and so on in the case where the printer is an ink-jet printer that uses ink for printing. The consumables further include printing sheets and copy sheets.

The information processing apparatus 1 is assigned with a task or tasks that are to be performed once or regularly for each printer by the information processing apparatus 1. The tasks to be performed by the information processing apparatus 1 for each printer include: a task for classifying the printer into a group or one of groups ("group assignment" which will be described below); a task for transmitting information indicating a status of use of the printer to the PC 20 each time when a predetermined length of time has elapsed ("log transmission" which will be described below); a task in which the information processing apparatus 1 determines whether the information processing apparatus 1 is to transmit a notification to the PC 20 each time when a predetermined length of time has elapsed, using information indicating the state of the printer which is transmitted from the printer, and the information processing apparatus 1 transmits the notification to the PC 20 when the notification is to be transmitted ("notification" which will be described below); and a task for transmitting, to the printer, setting information containing information to be set to the printer ("setting-file transmission" which will be described below). It is noted that information transmitted from each printer used for execution of the task is stored in the database 12 of the storage 10.

Each time when a predetermined length of time has elapsed, the controller 3 monitors whether a predetermined task as described above is assigned for each printer ("automatic managing and setting process" which will be described below). The controller 3 searches for the printers communicable with the information processing apparatus 1 according to a predetermined search schedule. When the controller 3 broadcasts a signal requesting the found printer to transmit information (which may be hereinafter referred to as "information-transmission request signal"), the printer having received the information-transmission request signal transmits a response signal to the information processing apparatus 1. The controller 3 determines whether a task is assigned to the information processing apparatus 1 for the printer having transmitted the response signal. The controller 3 stores a result of the determination into the task setting file 13 in the storage 10 (see FIG. 3).

User Interface

Figure 2:
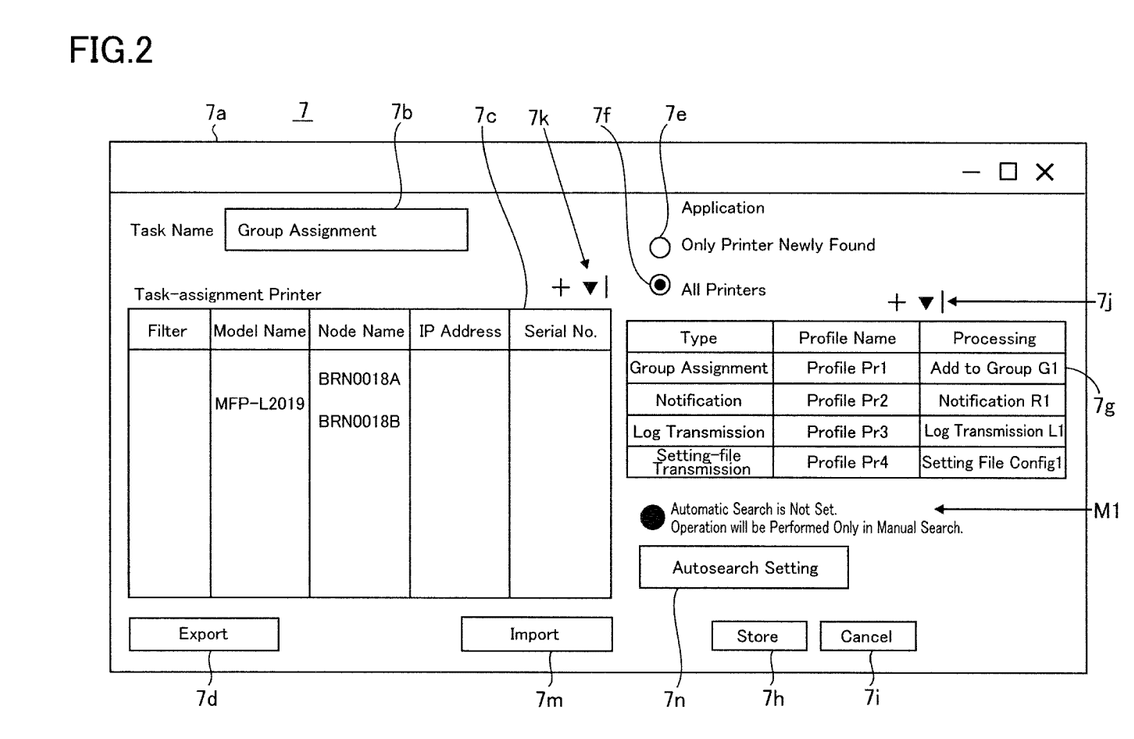
FIG. 2 is a view for explaining one example of a user interface displayed on a display of the information processing apparatus illustrated in FIG. 1.

There will be next described a user interface (UI) displayed on the display 7 of the information processing apparatus 1 with reference to FIG. 2 illustrating one example of the user interface. The user of the information processing apparatus 1 uses the user interface displayed on the display 7 to set a processing for automatically executing a processing for searching for the printer communicable with the information processing apparatus 1 and assigning a task or tasks for the found printer to the controller 3. In the following description, a computer program for automatically executing the processing for searching for the printer communicable with the information processing apparatus 1 and assigning a task or tasks for the found printer to the controller 3 may be referred to as "automatic managing and setting tool".

The display 7 displays a UI screen 7a. The user of the information processing apparatus 1 uses the UI screen 7a to set a condition of a printer for which the task is to be assigned among the found printers communicable with the information processing apparatus 1, and to assign a type of the task to be performed by at least one of the found printer or the controller 3, for example. The UI screen 7a includes: a task-name indicating portion 7b for displaying the name of the task setting file 13 set on the UI screen 7a; a task-assignment-printer-condition indicating portion 7c for displaying a condition for determining whether the found printer is a printer for which the task is to be assigned (which may be hereinafter referred to as "task-assignment-printer condition"); and a task-assignment-printer-condition setting button 7k for setting the task-assignment-printer condition. The UI screen 7a further includes: a task-setting-file indicating portion 7g for displaying a list of profiles of the respective tasks set in the task setting file 13 (FIG. 3) that is being set on the current UI screen 7a; a profile selection button 7j for selecting one of the profiles of the respective tasks which is to be set in the task setting file 13; a selection button 7e that is selected when the tasks displayed on the task-setting-file indicating portion 7g are applied only for a printer newly found; a selection button 7f that is selected when the tasks displayed on the task-setting-file indicating portion 7g are applied for all the found printers; and an Autosearch Setting button 7n for turning automatic search of the printer on. Pressing the Autosearch Setting button 7n displays a UI screen for setting an area for searching for the printers and setting the schedule of the automatic search of the printer. In the case where the automatic search of the printer is not set, the UI screen 7a displays a message M1 saying "Autosearch is Not Set. Operation will be Performed Only in Manual Search.", for example. The processing in which the controller 3 sets the type of the task set by the user on the UI screen 7a, into the task setting file 13 (FIG. 3), and the processing for setting the task-assignment-printer condition set by the user on the UI screen 7a are one example of a first processing.

The UI screen 7a further includes: a Store button 7h for storing information defined by the task setting file 13 (FIG. 3) that is being set on the current UI screen 7a; a Cancel button 7i for discarding the information defined by the task setting file 13 (FIG. 3) that is being set on the current UI screen 7a, without storing the information; an Export button 7d that is selected when information contained in the task setting file 13 is converted to information readable by another device and written out; and an Import button 7m that is selected when the task setting file 13 exported by another information processing apparatus 1 is input for use.

When the task-assignment-printer-condition setting button 7k is selected, the task-assignment-printer condition is displayed on a pull-down menu. In the present embodiment, desired task-assignment-printer conditions may be combined from among a model name, a node name, an IP address, a serial number (Serial No.), and a MAC address each as the task-assignment-printer condition. For example, when the model name is selected as the task-assignment-printer condition, the printer with the predetermined model name is displayed. The model name may be input manually. In the case where the node name is set as the task-assignment-printer condition, the user may designate a specific node name and may input characters shared among the node names to set a condition that the node name of the printer has the common characters, as the task-assignment-printer condition. In the illustrated example, the printer with the node name "BRN0018A", the printer with the model name "MFP-L2019", or the printer with the node name "BRN0018B" is a device for which the task is to be assigned to the controller 3. Likewise, the task-assignment-printer condition may be set for the IP address and the serial number. Two or more task-assignment-printer conditions combined in advance from among the model name, the node name, the IP address, the serial number (Serial No.), and the MAC address may be set as the task-assignment-printer conditions.

When the profile selection button 7j is selected, the types of the respective tasks are displayed on the pull-down menu. When one of the types is selected, a menu for setting the profile of the task is displayed. For example, the pull-down menu contains the tasks such as the log transmission, the notification, and the group assignment. For example, when the task of the log transmission is selected, the information processing apparatus 1 displays a setting screen for setting details of the task such as transmission of information about the printer on a daily or monthly basis, for example. When the task of the group assignment is selected, the information processing apparatus 1 displays a setting screen for setting details of the task such as addition to a group G1 or a group G2, for example. As illustrated in FIG. 2, a plurality of tasks may be assigned for a single printer found in the search. When the automatic managing and setting tool is executed, the information processing apparatus 1 searches for the printers communicable with the information processing apparatus 1, and the controller 3 is assigned with a task that is for executing a processing relating to a printer satisfying the task-assignment-printer condition among the found printers and that is displayed on the task-setting-file indicating portion 7g when the task setting file 13 is stored.

Task Setting File

Figure 3:
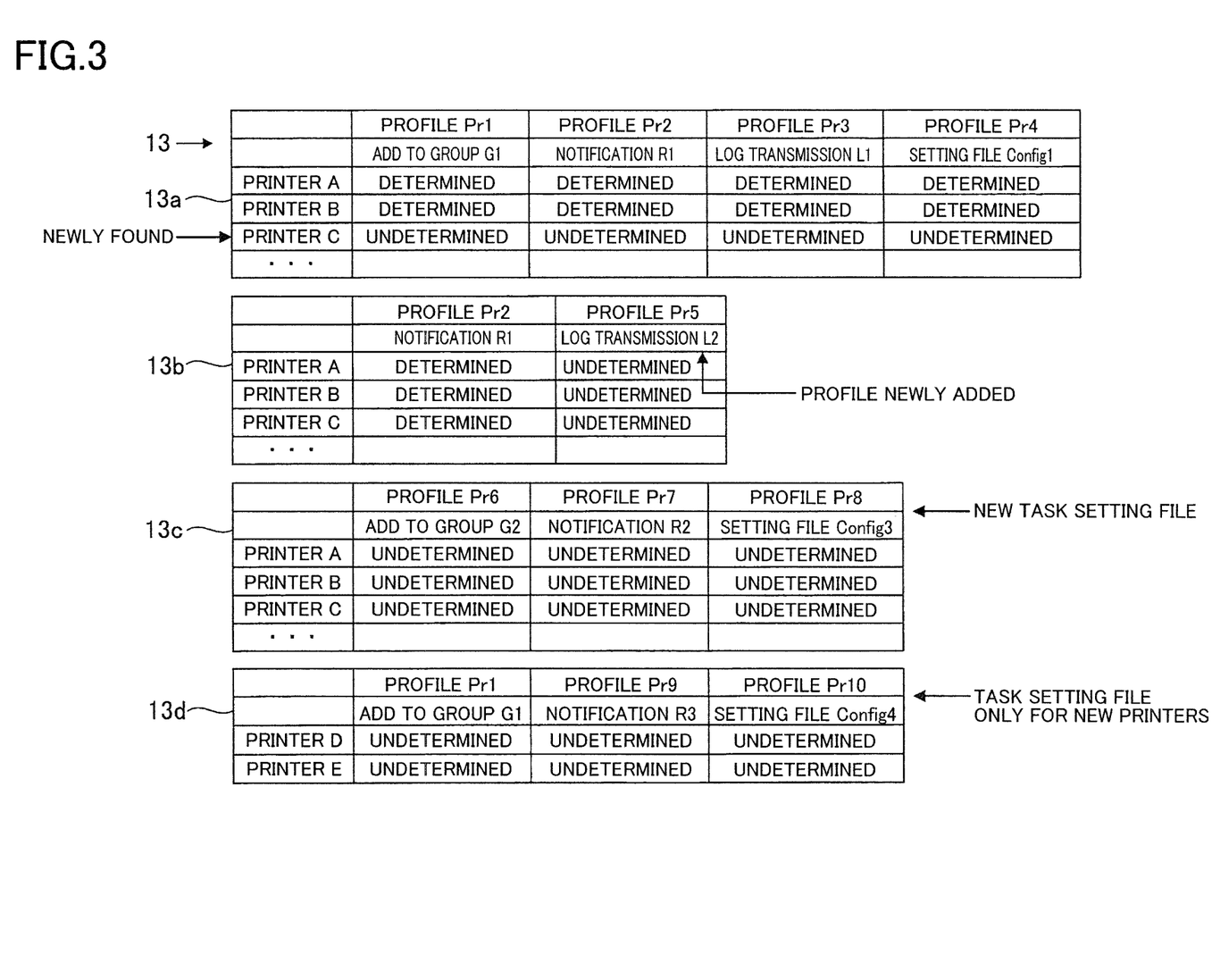
FIG. 3 is a view for explaining one example of a task setting file which is set in the information processing apparatus illustrated in FIG. 1.

There will be next described the contents of the task setting file with reference to FIG. 3 illustrating one example of the contents of the task setting file. The task setting file 13 stores: the task-assignment-printer condition and the type of the task to be performed which are set on the UI screen 7a; and a result of determination of whether each task has been assigned to each printer. More specifically, the task setting file 13 stores the task having the type and the content designated by the profile such that the task is associated with each printer. The task setting file 13 stores a result of determination such that in the case where the task setting file 13 is stored in the state in which the selection button 7e is pressed on the UI screen 7a, the task is applied only to the printer newly found, and in the case where the task setting file 13 is stored in the state in which the selection button 7f is pressed, the task is applied to all the printers communicable with the information processing apparatus 1. As illustrated in FIG. 3, "DETERMINED" in the task setting file 13 represents that determination of whether the task is assigned is finished, and "UNDETERMINED" represents that determination of whether the task is assigned is not finished.

A task setting file 13a is one example of the task setting file 13. In FIG. 3, the printers A, B are printers having already found in the search of the printers which is performed before the present search. The printer C is a printer newly found in the present search. The tasks having the types and the contents designated respectively by profiles Pr1-Pr4 are set to the task setting file 13a. In the task setting file 13a, the profiles Pr1-Pr4 are associated with each of the printers A-C. The profile Pr1 indicates a task of making the printer join the group G1. When the information processing apparatus 1 searches for the printers communicable with the information processing apparatus 1 according to the predetermined search schedule, the controller 3 refers to the task setting file 13a to determine whether the task associated with the profile Pr1 is assigned for the found printer in accordance with the task-assignment-printer condition and whether assignment of the task is finished, that is, whether the "DETERMINED" state is established. In the case of the "UNDETERMINED" state, the controller 3 is newly assigned with the task associated with the profile Pr1 for the printer as needed and writes information "DETERMINED" in association with the printer and the profile Pr1. In the illustrated example, the "DETERMINED" state is established for the profile Pr1 and each of the printers A, B.

The task of the notification is a processing in which the information processing apparatus 1 determines a state of the printer (for example, whether a remaining amount of the ink is low) and transmits a mail to, e.g., the PC 20 as needed (for example, in the case where the remaining amount of the ink is low). In the illustrated example, the "DETERMINED" is established for each of the printers A, B and the profile Pr2 indicating a task of making a notification R1.

The task of the log transmission is a processing in which the information processing apparatus 1 transmits a log transmitted from the printer (a status of use), to, e.g., the PC 20 without conditions (without such determination as performed in the above-described notification). In the illustrated example, the "DETERMINED" state is established for each of the printers A, B and the profile Pr3 indicating a task of executing log transmission L1. This indicates that the information processing apparatus 1 has determined whether the information processing apparatus 1 is assigned with a task of transmitting logs transmitted from the printers A, B, to, e.g., the PC 20. For example, the information processing apparatus 1 assigned with the task of the log transmission L1 transmits information indicating a state (a status) of a remaining amount of the toner or the ink, to the PC 20 every five minutes. The log transmission L1 may be a task in which when the remaining amount of the toner or the ink has decreased to a particular amount, the controller 30 sends the PC 20 information indicating this state. The information transmitted to the PC 20 in the log transmission L1 may include the number of printed pages, the number of copies, a history of printing errors, and information indicating a point of a malfunction or a failure.

The profile Pr4 indicates a task of transmitting a setting file Config1 to the printer. This task is performed by the controller 3. For example, information for causing the printer to stop a function of color printing and color copying is set to the setting file Config1. The printer having received the setting file Config1 rewrites a setting file stored in the printer to stop the function of the color printing and the color copying. In the illustrated example, the "DETERMINED" state is established for each of the printers A, B and the profile Pr4. This indicates that the controller 3 has determined whether the controller 3 is assigned with a task of transmitting the setting file Config1 to the printers A, B. The printer C in the task setting file 13a indicates a printer newly found in the search of the printers performed by the controller 3. Since the controller 3 has not determined whether the tasks associated with the respective profiles Pr1-Pr4 are assigned, the "UNDETERMINED" state is established for each of the profiles Pr1-Pr4. It is noted that a setting of inhibiting the color printing and the color copying is one example of a particular setting, and the setting file Config1 is one example of setting information.

A task setting file 13b is one example of the task setting file 13 in the case where a new profile is added to the task setting file 13 storing the existing profile. In the illustrated example, a profile Pry associated with log transmission L2 is newly added to the task setting file 13b storing an existing profile Pr2 associated with the notification R1. Since the controller 3 has not determined whether the task of the log transmission L2 is assigned for each printer, the "UNDETERMINED" state for the log transmission L2 and each of the printers A-C. Thus, when a new profile is added to the task setting file storing the existing profile, a column corresponding to the added profile is created. A task setting file 13c is one example of the task setting file 13 in the case where a new task to be performed by the information processing apparatus 1 is set. In the illustrated example, a profile Pr6 indicating "add to group G2", a profile Pr7 indicating notification R2, and a profile Pr8 indicating a setting file Config3 are set. Since all the tasks are new, and the controller 3 has not determined whether each task is assigned, the "UNDETERMINED" state is established for all the tasks and all the printers.

A task setting file 13d is one example of the task setting file 13 in the case where a task to be performed by the information processing apparatus 1 is set when a new printer is found in search of printers performed by the information processing apparatus 1 according to a predetermined search schedule. In the illustrated example, the profile Pr1 indicating "add to group G1", a profile Pr9 indicating notification R3, and a profile Pr10 indicating a setting file Config4 are set. Since the task setting file 13d is adaptable to printers newly found, and the controller 3 has not determined whether tasks are assigned to the information processing apparatus 1, the "UNDETERMINED" state is established for all the tasks and all the printers.

Automatic Managing and Setting Process

Figure 4:
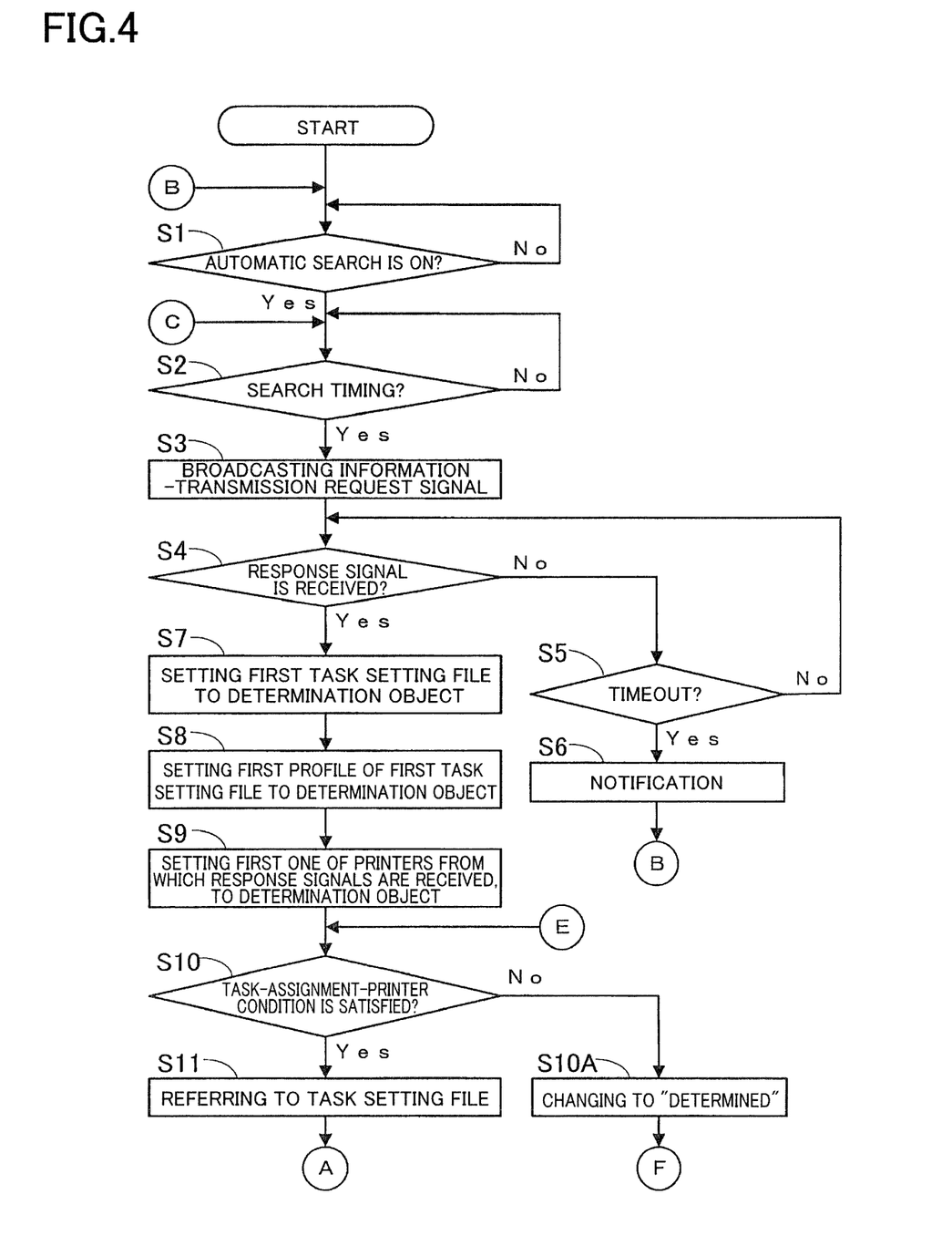
FIG. 4 is a flowchart representing a portion of an automatic managing and setting process that is executed by a controller of the information processing apparatus illustrated in FIG. 1.
Figure 5:
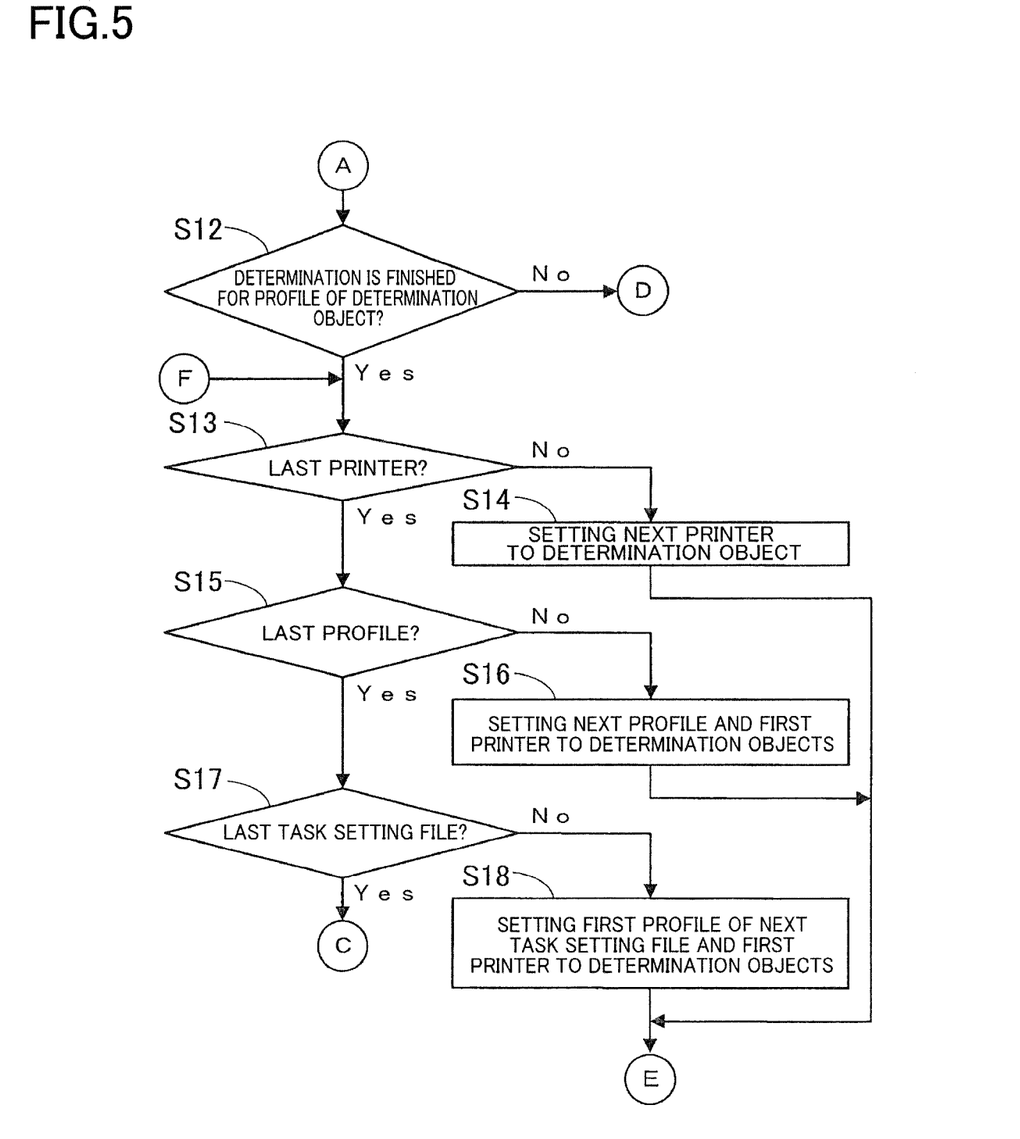
FIG. 5 is a flowchart representing another portion of the automatic managing and setting process which is continued from FIG. 4.
Figure 6:
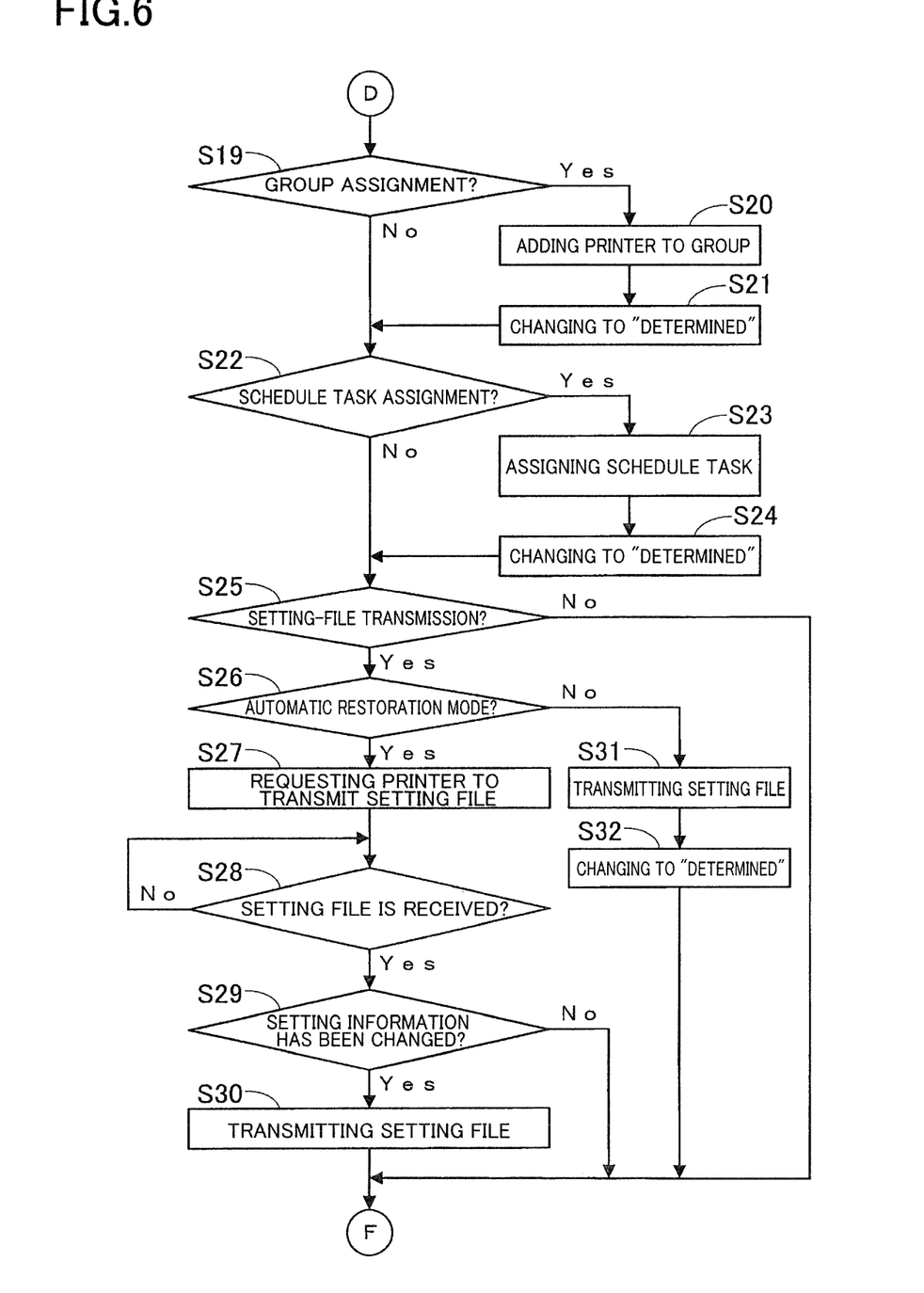
FIG. 6 is a flowchart representing yet another portion of the automatic managing and setting process which is continued from FIG. 5.

There will be next described the automatic managing and setting process that is executed by the controller 3 with reference to FIGS. 4-6. It is assumed that determination of whether a task is assigned is executed in the order of the task setting files 13a, 13b, 13c, 13d. It is noted that the automatic managing and setting process begins when the computer program 11 is started, for example.

The controller 3 at S1 determines whether the automatic search is ON. Here, in the case where the controller 3 determines that the automatic search has not been set, the controller 3 makes a notification indicating that the automatic search is not set. For example, as illustrated in FIG. 2, the controller 3 displays the message M1 saying "Automatic Search is Not Set. Operation will be Performed Only in Manual Search." on the display 7. That is, in the case where the controller 3 cannot perform at least the automatic search after execution of the processing at S1, the controller 3 executes a notification processing for making a notification that at least the automatic search cannot be performed. Thus, in the case where the automatic search is not set, the controller 3 can notify the user of this situation, enabling the user to perform settings for the automatic search. The user may operate a search button, not illustrated, to perform search. It is noted that the processing in which the controller 3 displays the message M1 on the display 7 is one example of the notification processing.

When the controller 3 determines that the Autosearch Setting button 7n is On (S1: Yes), the controller 3 at S2 determines whether the present timing is a timing when the controller 3 searches for the printers communicable with the information processing apparatus 1 according to a predetermined search schedule. The search schedule defines date and time of the automatic search. According to the search schedule, for example, the controller 3 performs the automatic search at a predetermined time on a daily basis or at a predetermined time on a predetermined day on a weekly basis. Here, when the controller 3 determines that the present timing is not the search timing (S2: No), the controller 3 waits until the search timing has come. When the controller 3 determines that the present timing is the search timing (S2: Yes), the controller 3 at S3 broadcasts the above-described information-transmission request signal to the LAN 15. For example, the information-transmission request signal is a signal for requesting the printer to transmit its serial number to the information processing apparatus 1.

The controller 3 at S4 determines whether the response signal is received from the printer to which the information-transmission request signal is transmitted. The response signal is a signal which responds to the information-transmission request signal. For example, the response signal has information indicating the serial number of the printer. The controller 3 identifies the found printer by receiving the response signal from the printer. It is noted that the processings at S3 and S4 are one example of a second processing. Here, when the controller 3 determines that the response signal is not received (S4: No), the controller 3 at S5 determines whether a timeout has occurred. When the controller 3 determines that a timeout has not occurred (S5: No), the controller 3 at S4 determines whether the response signal is received. That is, the controller 3 waits until a timeout has occurred. When the controller 3 determines that a timeout has occurred (S5: Yes), the controller 3 at S6 makes a notification that a timeout has occurred. For example, the controller 3 counts three seconds as an elapsed time from the broadcast of the information-transmission request signal, determines that a timeout has occurred (S5: Yes) when three seconds have elapsed, and displays a message saying "Printer is Not Found" or "Timeout has Occurred" on the UI screen 7a (FIG. 2).

When the controller 3 determines that the response signal is received (S4: Yes), the controller 3 at S7 sets the first task setting file 13a of the task setting files 13 (FIG. 3) to a determination object for which the controller 3 determines whether the task is assigned. The controller 3 at S8 sets the first profile of the first task setting file 13a set at S7, to a determination object for which the controller 3 determines whether the task is assigned. In the present embodiment, the controller 3 sets the profile Pr1 indicating "add to group G1" as the first profile of the task setting file 13a, to the determination object. The controller 3 at S9 sets the first one of the printers from which the response signals are received, to a determination object for which the controller 3 determines whether the task is assigned. For example, in the case where the response signals are received from the printers A, B, C in this order, the controller 3 sets the printer A as the first one of the printers, to the determination object. The controller 3 at S10 determines whether the printer as the determination object satisfies the task-assignment-printer condition. It is noted that the task-assignment-printer condition is one example of a particular condition, and the processing at S10 is one example of a third processing.

Here, when the controller 3 determines that the printer as the determination object satisfies the task-assignment-printer condition for the task setting file 13a set to the determination object at S7 (S10: Yes), the controller 3 at S11 refers to the task setting file 13a set at S7. The controller 3 at S12 in FIG. 5 determines whether the determination is finished for the profile of the determination object set at S8. Here, when the controller 3 determines that the determination is not finished for the profile of the determination object set at S8 (S12: No), the controller 3 at S19 in FIG. 6 determines whether the profile of the determination object set at S8 indicates "group assignment". In the present embodiment, since the first profile of the task setting file 13a indicates "add to group G1" as "group assignment", the controller 3 determines that the profile of the determination object set at S8 indicates "group assignment" (S19 in FIG. 6: Yes). Here, when the controller 3 determines that the profile of the determination object set at S8 indicates "group assignment" (S19: Yes), the controller 3 at S20 executes a task of adding the printer set to the determination object at S9 (FIG. 4), to a group. In the present embodiment, since the first profile of the task setting file 13a indicates "add to group G1" as "group assignment", the controller 3 at S20 executes a task of adding the printer set to the determination object at S9 (FIG. 4), to the group G1. The controller 3 at S21 changes "group assignment" associated with the printer set to the determination object at S9 (FIG. 4), to "DETERMINED". For example, when the printer set to the determination object at S9 is the printer A, as illustrated in FIG. 3, the controller 3 at S21 sets "DETERMINED" for "add to group G1" associated with the printer A in the task setting file 13a. It is noted that the processing at S20 is one example of a type of a task of adding the function executing apparatus found in the search in the second processing to a particular group.

When the controller 3 determines that the profile of the determination object set at S8 does not indicate "group assignment" (S19: No) or when the processing at S21 is executed, the controller at S22 determines whether the profile of the determination object set at S8 indicates "schedule task assignment". The schedule task is executed by the controller 3 according to the particular schedule. Examples of the schedule task include the notification and the log transmission. The schedule task assignment is assigning of the schedule task such as the notification and the log transmission. Here, when the controller 3 determines that the profile of the determination object set at S8 indicates "schedule task assignment" (S22: Yes), the controller 3 assigns the schedule task at S23. In the present embodiment, since the schedule tasks set in the task setting file 13a are the notification R1 and the log transmission L1, the controller 3 at S23 assigns the notification R1 and the log transmission L1. The controller 3 at S24 sets "DETERMINED" for "schedule task assignment" associated with the printer set to the determination object at S9 (FIG. 4). For example, when the printer set to the determination object at S9 is the printer A, as illustrated in FIG. 3, the controller 3 sets "DETERMINED" for the notification R1 and the log transmission L1 associated with the printer A in the task setting file 13a. It is noted that the processings at S20 and S23 are one example of a fourth processing.

When the controller 3 determines that the profile of the determination object set at S8 does not indicate "schedule task assignment" (S22: No) or when the processing at S24 is executed, the controller 3 at S25 determines whether the profile of the determination object set at S8 (FIG. 4) indicates "setting-file transmission". Here, when the controller 3 determines that the profile of the determination object set at S8 (FIG. 4) indicates "setting-file transmission" (S25: Yes), the controller 3 at S26 determines whether the information processing apparatus 1 is in an automatic restoration mode. The automatic restoration mode is a mode in which, when the controller 3 determines that the setting information of the setting file stored in the printer has been changed from setting information set by transmission of a setting file in an automatic managing and setting process executed before the current automatic managing and setting process, the controller 3 restores the changed setting information to the original setting information. Here, when the controller 3 determines that the information processing apparatus 1 is not in the automatic restoration mode (S26: No), the controller 3 at S31 transmits a setting file to the printer as the determination object set at S9 (FIG. 4) and at S32 sets "DETERMINED" for "setting-file transmission" associated with the printer set to the determination object at S9 (FIG. 4). For example, when the printer set to the determination object at S9 is the printer A, as illustrated in FIG. 3, the controller 3 sets "DETERMINED" for the setting file Config1 associated with the printer A in the task setting file 13a. When the controller 3 determines that the profile of the determination object set at S8 (FIG. 4) does not indicate "setting-file transmission" (S25: No), this flow returns to S13 (FIG. 5).

When the controller 3 determines that the information processing apparatus 1 is in the automatic restoration mode (S26: Yes), the controller 3 at S27 requests the printer set to the determination object at S9, to transmit a setting file. The request of transmission of the setting file is sending the printer a signal indicating a request of transmission of the setting file stored in the printer to the information processing apparatus 1. The controller 3 at S28 determines whether the setting file is received from the printer requested to transmit the setting file and waits for the reception. When the controller 3 determines that the setting file is received (S28: Yes), the controller 3 at S29 determines whether setting information of the received setting file has been changed, by comparing the received setting file with the setting file transmitted to the printer for the particular setting by the controller 3 in the automatic managing and setting process executed before the current automatic managing and setting process. Here, when the controller 3 determines that the setting information of the received setting file has been changed (S29: Yes), the controller 3 at S30 sends the printer the original setting information that is the setting information transmitted to the printer previously, and this flow returns to S13 (FIG. 5). The printer having received the original setting information rewrites the setting information of the setting file to the original setting information for restoration. When the controller 3 determines that the setting information of the received setting file has not been changed (S29: NO), the controller 3 does not send the printer the original setting information that is the setting information transmitted to the printer previously, and this flow goes to S13 (FIG. 5).

For example, it is assumed that the setting file Config1 set in the task setting file 13a (FIG. 3) is a setting file to which the setting information for stopping the function of color printing and copying is set, and the setting information of the setting file Config1 stored in the printer C is rewritten so as not to stop the function of color printing and copying. In this case, the controller 3 determines that the setting information of the setting file transmitted from the printer C has been changed (S29: Yes), and the controller 3 at S30 sends the printer C the original setting information, i.e., the setting file Config1 to which the setting information for stopping the function of color printing and copying is set. As a result, the setting file Config1 set for the printer C is restored to the setting file for stopping the function of color printing and copying. That is, the controller 3 determines whether the setting information stored in the printer searched at S3 has been changed from the original particular setting, and when the controller 3 determines that the setting information has been changed, the controller 3 stores the original setting information again into the printer searched at S3, and when the controller 3 determines that the setting information has not been changed, the controller 3 executes a task of inhibiting storing of the original setting information into the printer searched at S3 again. It is noted that the processings at S27-S30 are one example of a task of storing the setting information. When the controller 3 at S10 (FIG. 4) determines that the printer as the determination object does not satisfy the task-assignment-printer condition for the task setting file 13a set to the determination object at S7 (S10 in FIG. 4: No), the controller 3 at S10A sets "DETERMINED" for the determination. When the controller 3 determines that the determination is finished for the profile of the determination object set at S8 (FIG. 4) (S12: Yes), the controller 3 at S13 in FIG. 5 determines whether the printer as the determination object is the last printer to be set to the determination object. It is noted that the processing at S31 is one example of a type of a task of storing the setting information into the function executing apparatus searched in the second processing.

Here, when the controller 3 determines that the printer as the determination object is not the last printer to be set to the determination object (S13: No), the controller 3 at S14 sets the next one of the printers from which the response signals are received, to the determination object, and executes the processing at S10 (FIG. 4) and subsequent processings to execute various processings such as assignment of the task. For example, when the response signals are received from the printers A, B, C in this order, and the controller 3 at S9 in FIG. 4 sets the printer A to the first determination object, the controller 3 at S14 sets the second printer B having received the response signal, to the determination object and executes the processing at S10 (FIG. 4) and subsequent processings to execute various processings such as assignment of the task. When the controller 3 determines that the printer as the determination object is the last printer to be set to the determination object (S13: Yes), the controller 3 at S15 determines whether the profile set at S8 (FIG. 4) is the last profile to be set to the determination object. For example, when the profile set at S8 is the profile Pr1 indicating "add to group G1" set in the task setting file 13a, profiles such as the next profile Pr2 indicating the notification R1 remains in the task setting file 13a as undetermined objects, and accordingly the controller 3 determines that the profile Pr1 is not the last profile (S15: No). Here, when the controller 3 determines that the profile set at S8 (FIG. 4) is not the last profile to be set to the determination object (S15: No), the controller 3 at S16 sets the next profile and the first printer to the determination objects and executes the processing at S10 (FIG. 4) and subsequent processings to execute various processings such as assignment of the task. For example, when the profile set at S8 (FIG. 4) is the profile Pr1 indicating "add to group G1" set in the task setting file 13a, the controller 3 at S16 sets the next profile Pr2 indicating the notification R1 and the printer A to the determination objects and executes the processing at S10 (FIG. 4) and subsequent processings to execute various processings such as assignment of the task.

When the controller 3 determines that the profile set at S8 (FIG. 4) is the last profile to be set to the determination object (S15: Yes), the controller 3 at S17 determines whether the task setting file used for this determination is the last task setting file to be set to the determination object. For example, when the task setting file used for this determination is the task setting file 13a, the task setting files 13b-13d to be set to the second to fourth determination object remain as the determination objects, and accordingly the controller 3 determines that the task setting file used for this determination is not the last task setting file to be set to the determination object (S17: No). Here, when the controller 3 determines that the task setting file used for this determination is not the last task setting file to be set to the determination object (S17: No), the controller 3 at S18 sets the first profile of the next task setting file and the first printer to the determination objects and executes the processing at S10 (FIG. 4) and subsequent processings to execute various processings such as assignment of the task. For example, the controller 3 sets the first printer A and the notification R1 indicated by the first profile in the next task setting file 13b, to the determination objects. When the controller 3 determines that the task setting file used for this determination is the last task setting file to be set to the determination object (S17: Yes), this flow returns to S2 (FIG. 4), and the controller 3 waits until the next search timing has come.

As described above, the non-transitory storage medium stores a plurality of instructions executable by the processor of the information processing apparatus 1 communicable with the function executing apparatus. When executed by the processor, the plurality of instructions cause the information processing apparatus 1 to execute: a first processing in which the information processing apparatus 1 sets a type of a task that is to be executed by at least one of the information processing apparatus 1 or the function executing apparatus and that is for execution of a processing relating to the function executing apparatus; a second processing (S3 and S4) in which the information processing apparatus 1 identifies the function executing apparatus communicable with the information processing apparatus 1; a third processing (S10) in which the information processing apparatus 1 determines whether the function executing apparatus identified in the second processing satisfies a particular condition; and a fourth processing (S20, S23) in which when the information processing apparatus 1 determines in the third processing that the function executing apparatus identified in the second processing satisfies the particular condition (S10: Yes), the information processing apparatus 1 causes at least one of the function executing apparatus determined in the third processing to satisfy the particular condition or the information processing apparatus 1 to perform the task of the type set in the first processing, and when the information processing apparatus 1 determines in the third processing that the function executing apparatus identified in the second processing does not satisfy the particular condition, the information processing apparatus 1 does not cause the function executing apparatus determined in the third processing not to satisfy the particular condition and the information processing apparatus 1 to perform the task of the type set in the first processing.

The information processing apparatus 1 is communicable with the function executing apparatus. The information processing apparatus 1 includes the controller 3. The controller 3 is configured to execute: a first processing in which the controller 3 sets a type of a task that is to be executed by at least one of the information processing apparatus 1 or the function executing apparatus to be searched and that is for execution of a processing relating to the function executing apparatus; a second processing (S3 and S4) in which the controller 3 identifies the function executing apparatus communicable with the information processing apparatus 1; a third processing (S10) in which the controller 3 determines whether the function executing apparatus identified in the second processing satisfies a particular condition; and a fourth processing (S20, S23) in which when the controller 3 determines in the third processing that the function executing apparatus identified in the second processing satisfies the particular condition (S10: Yes), the controller 3 causes at least one of the function executing apparatus determined in the third processing to satisfy the particular condition or the information processing apparatus 1 to perform the task of the type set in the first processing, and when the controller 3 determines in the third processing that the function executing apparatus identified in the second processing does not satisfy the particular condition, the controller 3 does not cause the function executing apparatus determined in the third processing not to satisfy the particular condition and the information processing apparatus 1 to perform the task of the type set in the first processing.

In the information processing apparatus 1 described above, while the controller 3 is executing the task, the controller 3 does not execute the automatic managing and setting process. This configuration enables the controller 3 to accurately execute the automatic managing and setting process.

Export Function

The controller 3 has an export function of writing out information set to the information processing apparatus 1, while changing its form such that a device such as another information processing apparatus can use the information. Examples of the information set to the information processing apparatus 1 include: information required for execution of the automatic managing and setting process; a list of the printers; and the task setting file 13 (FIG. 3). This export function is performed by selection of the Export button 7d (FIG. 2). Information set to the information processing apparatus 1 is exportable in the form of a compressed file, e.g., a self-extracting zip (registered trademark) file, or one file in combination. The exported file may be stored into a particular storage medium via an output terminal connected to the information-processing-apparatus body 2 (FIG. 1). For example, the exported file may be stored into a USB memory connected to the USB terminal 14 (FIG. 1).

Import Function

The controller 3 has an import function of inputting the above-described information set to a device such as another information processing apparatus, to the information processing apparatus 1, while changing its form such that the information processing apparatus 1 can use the information. This import function is performed by selection of the Import button 7m (FIG. 2). The information is importable in the form of a compressed file, e.g., a self-extracting zip (registered trademark) file, or one file in combination. In the case where the automatic managing and setting process is being executed also in the information processing apparatus to which the information is imported, the information processing apparatus to which the information is imported executes identification of the information by comparing imported task setting files with task setting files having been set to the information processing apparatus since before the import. For example, the information processing apparatus to which the information is imported determines whether there are identical profiles and whether lists of the printers are identical. In the case where a negative decision is made in at least one of the determinations, the information processing apparatus to which the information is imported makes a notification. The information processing apparatus to which the information is imported interrupts processings such as setting of imported data until positive decisions are made in all of the determinations.

In the case where the information processing apparatus 1 is changed to another information processing apparatus, information set to the information processing apparatus 1 is first exported to a device such as a USB memory. The USB memory is connected to the changed information processing apparatus, and the information stored in the connected USB memory is imported to the changed information processing apparatus. Thus, using the export function and the import function enables the changed information processing apparatus to execute the automatic managing and setting process like the information processing apparatus 1 before the change. Also, the export function and the import function eliminate the need for the user to operate the changed information processing apparatus to set information necessary for execution of the automatic managing and setting process, for example. Accordingly, even in the case where the information processing apparatus 1 is changed, it is possible to reduce the load of operations required for preparing for execution of the automatic managing and setting process. It is noted that the processing for exporting a file containing information is one example of a processing for outputting a file.

Effects

In the above-described embodiment, in the case where a new printer is connected to the LAN 15, the information processing apparatus 1 can automatically perform a setting for assigning, in association with a printer newly connected, a task of transmitting the information indicating the state of the printer from the information processing apparatus 1 to the PC 20, for example. This configuration reduces the load of operations for the user of the information processing apparatus 1.

In the above-described embodiment, in the case where the printers communicable with the information processing apparatus 1 are divided into a plurality of groups, it is possible to perform a task of adding the printer found in search to a particular one of the groups. That is, it is possible to automatically add the found printer to a particular group communicable with the information processing apparatus 1, thereby reducing the load of operations for the user of the information processing apparatus 1.

In the above-described embodiment, it is possible to automatically perform a task of storing the setting file into the found printer, thereby reducing the load of operations for the user of the information processing apparatus 1.

In the above-described embodiment, even in the case where the setting information of the setting file stored in the printer has been changed, it is possible to restore the setting file for the printer by transmitting the original setting information to the printer. That is, it is possible to automatically restore the setting file for the printer, thereby reducing the load of operations for the user of the information processing apparatus 1. It is also possible for the user of the information processing apparatus 1 to know whether the setting information of the setting file stored in the printer has been changed.

In the above-described embodiment, a plurality of tasks may be set, making it possible to perform a plurality of tasks for the information processing apparatus 1.

In the above-described embodiment, the user can select the selection button 7e when the tasks displayed on the task-setting-file indicating portion 7g are applied to a printer newly found, and select the selection button 7f when tasks displayed on the task-setting-file indicating portion 7g are applied to all the found printers. In particular, when the selection button 7e is ON, the tasks can be applied only to a printer newly found, making it possible to reduce the processing load when compared with a processing that applies the tasks also to the printers having been found already.

OTHER EMBODIMENTS

The computer program and the information processing apparatus may be configured such that the printer communicable with the information processing apparatus 1 performs a task. For example, the information processing apparatus 1 assigns a task to the printer, and the printer executes the task assigned thereto. For example, in the case where the printer is a laser printer, the information processing apparatus 1 assigns, to the printer, a task of regularly sending the information processing apparatus 1 information indicating a remaining amount of toner. In this case, the printer stores a computer program for executing the task according to a particular schedule and executes the task according to the computer program.

The information processing apparatus 1 may be configured to communicate with each printer over a wireless LAN. The information processing apparatus 1 may be configured to communicate with each printer using a communications protocol such as Bluetooth (registered trademark).

The techniques in the present disclosure may be applied to computer programs and information processing apparatuses for controlling function executing apparatuses different from the printer such as scanners.

The computer program in the present disclosure may be obtained not only from the Web but also from storage media such as USB memories and CD-ROMs. Also, the computer program in the present disclosure may be obtained by communicating with another information processing apparatus storing the computer program.

What is claimed is:

1. A non-transitory storage medium storing a plurality of instructions executable by a processor of an information processing apparatus communicable with a function executing apparatus, the plurality of instructions, when executed by the processor, causing the information processing apparatus to execute:
   a first processing in which the information processing apparatus sets a type of a task that is to be executed by at least one of the information processing apparatus or the function executing apparatus and that is for execution of a processing relating to the function executing apparatus;
   a second processing in which the information processing apparatus identifies the function executing apparatus communicable with the information processing apparatus;
   a third processing in which the information processing apparatus determines whether the function executing apparatus identified in the second processing satisfies a particular condition; and
   a fourth processing in which when the information processing apparatus determines in the third processing that the function executing apparatus identified in the second processing satisfies the particular condition, the information processing apparatus causes at least one of the function executing apparatus determined in the third processing to satisfy the particular condition or the information processing apparatus to perform the task of the type set in the first processing, and when the information processing apparatus determines in the third processing that the function executing apparatus identified in the second processing does not satisfy the particular condition, the information processing apparatus does not cause the function executing apparatus determined in the third processing not to satisfy the particular condition and the information processing apparatus to perform the task of the type set in the first processing.

2. The non-transitory storage medium according to claim 1, wherein the second processing is executed according to a particular schedule.

3. The non-transitory storage medium according to claim 1, wherein types of the task which are settable in the first processing comprise a type of the task of adding the function executing apparatus identified in the second processing to a particular group.

4. The non-transitory storage medium according to claim 1, wherein types of the task which are settable in the first processing comprise a type of the task of storing setting information for execution of a particular setting, into the function executing apparatus identified in the second processing.

5. The non-transitory storage medium according to claim 4, wherein the task of storing the setting information is a task of:
 determining whether the setting information stored in the function executing apparatus identified in the second processing has been changed from the particular setting;
 when it is determined that the setting information stored in the function executing apparatus identified in the second processing has been changed, storing the setting information into the function executing apparatus identified in the second processing again; and
 when it is determined that the setting information stored in the function executing apparatus identified in the second processing has not been changed, not storing the setting information into the function executing apparatus identified in the second processing again.

6. The non-transitory storage medium according to claim 1, wherein when executed by the processor, the plurality of instructions cause the information processing apparatus to execute the fourth processing for the function executing apparatus newly identified in the second processing and determined in the third processing to satisfy the particular condition.

7. The non-transitory storage medium according to claim 1, wherein the information processing apparatus is capable of, in the first processing, setting a plurality of types each as the type of the task.

8. The non-transitory storage medium according to claim 1, wherein when executed by the processor, the plurality of instructions cause the information processing apparatus not to execute the second processing, the third processing, and the fourth processing while the task of the type set in the first processing is being executed.

9. The non-transitory storage medium according to claim 1, wherein when executed by the processor, the plurality of instructions cause the information processing apparatus to execute a notification processing in which when the information processing apparatus cannot execute at least the second processing after the first processing, the information processing apparatus makes a notification that the information processing apparatus cannot execute at least the second processing.

10. The non-transitory storage medium according to claim 1, wherein when executed by the processor, the plurality of instructions cause the information processing apparatus to execute a processing in which the information processing apparatus outputs the type of the task set in the first processing as a file.

11. An information processing apparatus communicable with a function executing apparatus, the information processing apparatus comprising a controller,
 the controller being configured to execute:
  a first processing in which the controller sets a type of a task that is to be executed by at least one of the information processing apparatus or the function executing apparatus to be searched and that is for execution of a processing relating to the function executing apparatus;
  a second processing in which the controller identifies the function executing apparatus communicable with the information processing apparatus;
  a third processing in which the controller determines whether the function executing apparatus identified in the second processing satisfies a particular condition; and
  a fourth processing in which when the controller determines in the third processing that the function executing apparatus identified in the second processing satisfies the particular condition, the controller causes at least one of the function executing apparatus determined in the third processing to satisfy the particular condition or the information processing apparatus to perform the task of the type set in the first processing, and when the controller determines in the third processing that the function executing apparatus identified in the second processing does not satisfy the particular condition, the controller does not cause the function executing apparatus determined in the third processing not to satisfy the particular condition and the information processing apparatus to perform the task of the type set in the first processing.

* * * * *